No. 814,780. PATENTED MAR. 13, 1906.
C. C. GROSSHAUSER.
VEHICLE.
APPLICATION FILED APR. 28, 1905.

WITNESSES:
D. E. Carlsen.
E. C. Carlsen.

INVENTOR:
Charles C. Grosshauser.
BY ATTORNEY:
A. M. Carlsen.

UNITED STATES PATENT OFFICE.

CHARLES C. GROSSHAUSER, OF SHAKOPEE, MINNESOTA.

VEHICLE.

No. 814,780.　　　Specification of Letters Patent.　　　Patented March 13, 1906.

Application filed April 28, 1905. Serial No. 257,862.

*To all whom it may concern:*

Be it known that I, CHARLES C. GROSSHAUSER, a citizen of the United States, residing at Shakopee, in the county of Scott and State of Minnesota, have invented certain new and useful Improvements in Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicles or vehicle-gears; and the main objects are to provide a six-wheeled vehicle so constructed that the weight of the load put upon it is about equally supported by all the wheels and that the steering and propulsion of the vehicle are facilitated. These and other objects I attain by the novel construction and combination of parts illustrated in the accompanying drawings, in which—

Figure 1:
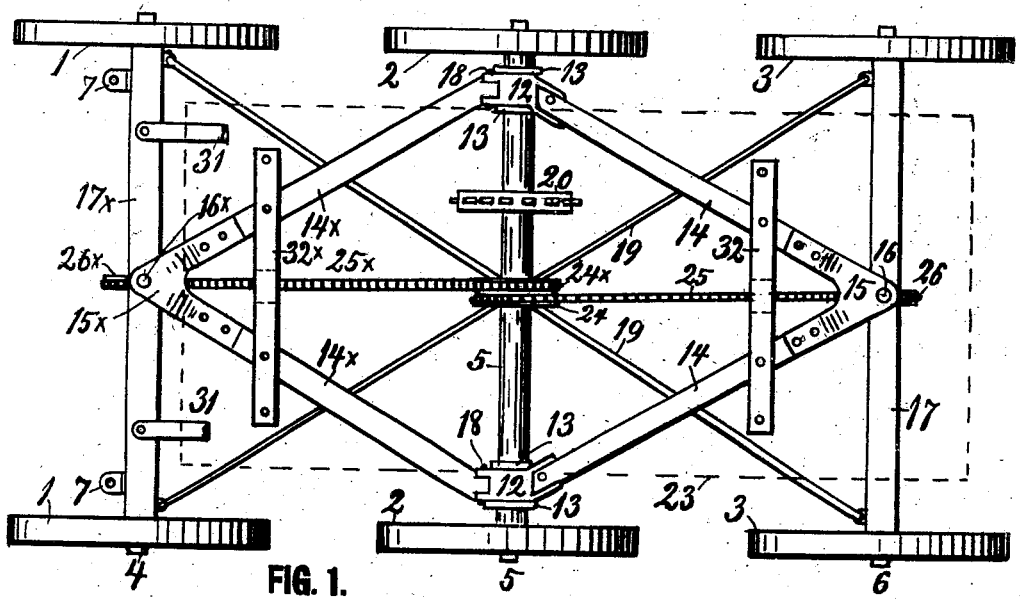
Figure 2:
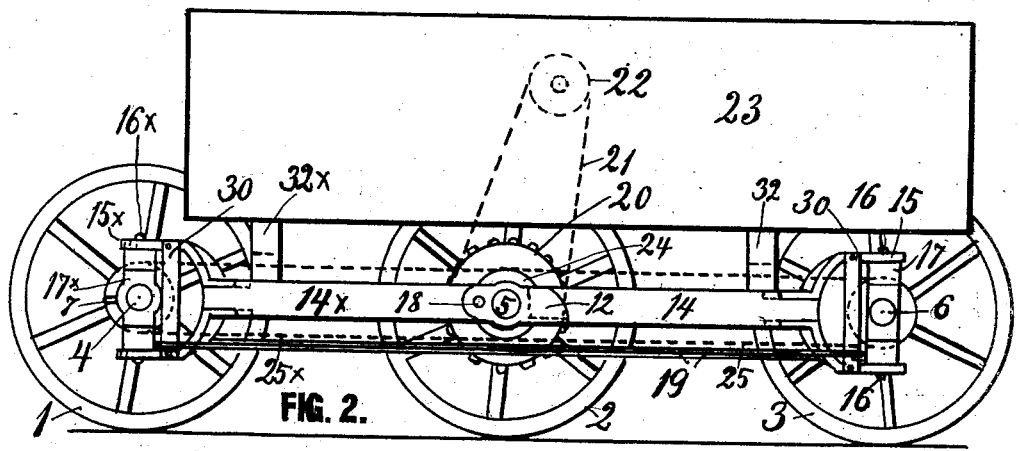
Figures 3, 4, 5:
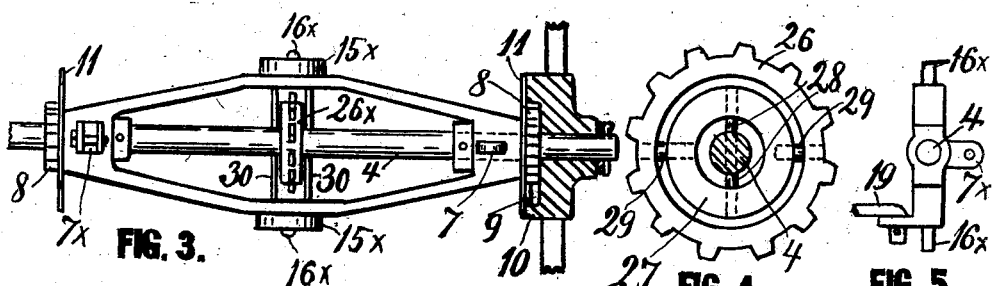

Figure 1 is a top or plan view of my improved vehicle-gear with the box or body of the vehicle only in dotted outlines. Fig. 2 is a side elevation of a vehicle embodying my improvements with the wheels of one side removed. Fig. 3 is a front end elevation of a portion of the vehicle with one wheel-hub shown in diametrical section. This view also represents the corresponding parts of the rear end of the vehicle. Fig. 4 is a side elevation of the sprocket-wheel used upon the middle of the front and rear axle, and Fig. 5 is an end view of the front axle and a yoke in which it is journaled.

The vehicle may be drawn by animals or other means or may be propelled by a motor, as an automobile.

Referring to the drawings by reference-numerals, 1 represents the front wheels, 2 the middle wheels, and 3 the hind wheels, of the vehicle. When the vehicle is intended to be drawn by animals or a traction-engine, all the supporting wheels 1 2 3 are simply journaled on the ends of the axles 4 5 6 and the horses or other means of traction are hitched to the thill-irons, like 7, or like $7^\times$ in Fig. 3; but when the vehicle is to carry its own motive power the middle wheels 2 are fixed on the axle 5, and the front and rear axles carry fixed ratchet-wheels 8, engaging dogs 9, pivoted in a cavity in the hub 10 of the wheel, as shown in Fig. 3. 11 is a plate covering said cavity.

The middle axle 5 is journaled in two frame-blocks 12, guided between collars 13. To the rear ends of said blocks are rigidly fixed the bars or hounds 14, whose rear ends are brought together and united by a fork-shaped plate 15, pivoted at 16 to the upper and lower bars of a yoke 17, in which the rear axle 6 is journaled. The front axle carries a similar yoke $17^\times$, likewise pivoted in the fork $15^\times$, uniting the front hounds $14^\times$, whose rear ends are pivoted at 18 to the frame-blocks 12. The yokes 17 $17^\times$ have their ends connected by crossing braces 19, which may be bars, chains, or wire ropes.

Upon the axle 5 is secured a sprocket-wheel 20, which is driven by a chain belt 21 and an engine or other motor, designated by the numeral 22 in Fig. 2 as being mounted inside the wagon-box 23.

From two sprocket-wheels 24 $24^\times$, fixed on the axle 5, extend two endless chains 25 $25^\times$, driving the sprocket-wheels 26 and $26^\times$, fixed on the axles 6 and 4, respectively. Each of said wheels 26 $26^\times$ is fixed on the axle by a universal joint consisting of the ring 27, having internal trunnions 28 in the axle and external trunnions 29 at right angles with the inner trunnions and supporting the wheel 26, so that the axles 4 and 6 are at full liberty to be swung on their pivots 16 $16^\times$ in steering the vehicle, while the sprocket-wheels 26 and $26^\times$ remain in proper position for the chains 25 $25^\times$, the wheels being guided between vertical bars or plates 30, fixed to the forks 15 and $15^\times$. When the vehicle is propelled by its own motor, it is steered by any suitable lever or wheel mechanism (not shown) connected with either the rear or front axle by rods, like 31 in Fig. 1, or any other suitable connection with the front or rear yoke, or both of them.

The box or body of the vehicle is supported upon two bolsters 32 $32^\times$, secured upon the hounds at such a distance from the front and rear axles that the load is carried about equally by the three axles. A slight play (not shown) is provided for in the connection between the box and the bolsters to allow for sinking and raising of the middle wheels when the ground is uneven. 33 represents clearings in the bolsters for the chains 25 $25^\times$.

In the operation it will be understood that the joints 18 allow all the six wheels to bear on the ground and properly support the load, that all the wheels help to propel the vehicle along, so that when one or more wheels strike obstructions the others will pull and keep up an even motion, which is especially useful when an automobile gets with one or two wheels into a ditch and is almost, if not entirely, unable to get away by its own help. It will also be understood that whether the vehicle is drawn or propelled the rods or connections 19 turn the front and rear axle in opposite directions, thus facilitating the turning of the vehicle, which is believed to be a new feature in automobiles. It will further be understood that when the vehicle, as an automobile, is to move backward or turn none of the wheels need drag on the ground, as the four corner-wheels are free to revolve rearwardly on the axles, the spring-pressed dogs 9 playing over the teeth of the ratchet-wheels 8.

Among other mechanical variations the hounds 14$^\times$ may be journaled on the axle 5 instead of to the blocks 12.

Having thus described the invention, what I claim, and desire to secure by Letters Patent, is—

1. An automobile having three axles with six wheels arranged to support equally the weight of the vehicle, and means for driving all of said wheels in unison, the front and rear wheels having ratchet-wheel and dog connection with the axles to allow rearward motion of the wheels on the axles.

2. An automobile comprising a frame, a yoke pivoted at its middle to swing horizontally in the end of the frame, a steering-axle journaled in the ends of the yoke, a wheel mounted by a universal joint upon the middle of the axle, guiding means for holding said wheel always in longitudinal direction of the vehicle, a motor on the vehicle and means connecting the motor with said wheel, and means for swinging the yoke in steering.

3. An automobile comprising a frame, a yoke pivoted at its middle to swing horizontally in the end of the frame, a steering-axle journaled in the ends of the yoke, a wheel mounted by a universal joint upon the middle of the axle, guiding means for holding said wheel always in longitudinal direction of the vehicle, a motor on the vehicle and means connecting the motor with said wheel, and means for swinging the yoke in steering; said connecting means consisting of a chain belt and sprocket-teeth on the driving and driven wheel.

4. A vehicle comprising three axles and six supporting-wheels, one at each end of the axles, a frame made up of two sections, one section resting on the middle axle and one of the end axles, the other section being pivotally secured to the first section by a vertically-swinging joint and having its other end supported by the other end axle, and means for supporting a load upon said frame.

5. A vehicle comprising three axles and six supporting-wheels, one at each end of the axles, a frame made up of two sections, one section resting on the middle axle and one of the end axles, the other section being pivotally secured to the first section by a vertically-swinging joint and having its other end supported by the other end axle, and means for supporting a load upon said frame, said frame having a longitudinal play in its connection with the load-supporting means.

In testimony whereof I affix my signature in presence of two witnesses.

CHARLES C. GROSSHAUSER.

Witnesses:
EDWARD HOENCK.
JAMES McHALE.